US009733844B2

(12) United States Patent
Gong et al.

(10) Patent No.: US 9,733,844 B2
(45) Date of Patent: Aug. 15, 2017

(54) DATA MIGRATION METHOD, DATA MIGRATION APPARATUS, AND STORAGE DEVICE

(71) Applicant: Huawei Technologies Co., Ltd., Shenzhen (CN)

(72) Inventors: Tao Gong, Chengdu (CN); Kun Han, Chengdu (CN); Liming Wu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/662,928

(22) Filed: Mar. 19, 2015

(65) Prior Publication Data

US 2015/0193154 A1 Jul. 9, 2015

Related U.S. Application Data

(63) Continuation of application No. PCT/CN2013/084093, filed on Sep. 24, 2013.

(51) Int. Cl.
*G06F 12/00* (2006.01)
*G06F 13/00* (2006.01)
(Continued)

(52) U.S. Cl.
CPC .......... *G06F 3/0616* (2013.01); *G06F 3/0608* (2013.01); *G06F 3/0647* (2013.01); *G06F 3/0688* (2013.01); *G06F 3/0689* (2013.01)

(58) Field of Classification Search
CPC .... G06F 3/0608; G06F 3/0614; G06F 3/0616; G06F 3/0617; G06F 3/0619;
(Continued)

(56) References Cited

U.S. PATENT DOCUMENTS 5,724,539 A * 3/1998 Riggle ................. G06F 3/0613
370/468
7,275,154 B2 * 9/2007 Butron ................. G06F 3/0611
707/E17.01
(Continued)

FOREIGN PATENT DOCUMENTS

CN 102713828 A 10/2012
CN 102880570 A 1/2013
(Continued)

OTHER PUBLICATIONS

Improving Flash Resource Utilization at Minimal Management Cost in Virtualized Flash-based Storage Systems; Tai et al; IEEE Transactions on Cloud Computing, vol PP, iss 99; Apr. 21, 2015; pp. 1-14 (14 pages).*

(Continued)

*Primary Examiner* — Daniel C Chappell
(74) *Attorney, Agent, or Firm* — Conley Rose, P.C.

(57) ABSTRACT

A method for extending life of a storage system, wherein a storage controller determines a source solid-state disk (SSD) in a disk group with a capacity usage ratio greater than an average capacity usage ratio of the disk group. The capacity usage ratio of the source SSD is a ratio of a used capacity of the source SSD to an available capacity of the source SSD. The storage controller selects at least one destination SSD in the disk group with a capacity usage ratio less than the average capacity usage ratio of the disk group. And then the storage controller calculates an amount of data to be migrated from the source SSD, based on the capacity usage ratio of the source SSD and the average capacity usage ratio. At last, the storage controller migrates the data to be migrated from the source SSD to the one or more destination SSDs.

15 Claims, 3 Drawing Sheets

(51) Int. Cl.
*G06F 13/28* (2006.01)
*G06F 3/06* (2006.01)

(58) Field of Classification Search
CPC .... G06F 3/0628; G06F 3/0629; G06F 3/0638; G06F 3/064; G06F 3/0643; G06F 3/0647; G06F 3/0649; G06F 3/0668; G06F 3/0671; G06F 3/0673; G06F 3/0674; G06F 3/0676; G06F 3/0677; G06F 3/0679; G06F 3/068; G06F 3/0683; G06F 3/0685; G06F 3/0688; G06F 3/0689; G06F 12/0246; G06F 13/00; G06F 13/10; G06F 13/12; G06F 13/124; G06F 13/14; G06F 13/16; G06F 13/1668; G06F 13/18
See application file for complete search history.

(56) References Cited

U.S. PATENT DOCUMENTS

| | | | | |
|---|---|---|---|---|
| 7,650,480 | B2* | 1/2010 | Jiang | G06F 3/0616 365/185.33 |
| 8,364,858 | B1* | 1/2013 | Martin | G06F 13/00 707/809 |
| 2003/0084241 | A1* | 5/2003 | Lubbers | G06F 3/0601 711/114 |
| 2003/0177310 | A1* | 9/2003 | Katsuragi | G06F 3/061 711/114 |
| 2005/0015547 | A1 | 1/2005 | Yokohata et al. | |
| 2006/0282644 | A1* | 12/2006 | Wong | G06F 12/0246 711/206 |
| 2009/0094409 | A1* | 4/2009 | Yeh | G06F 12/0246 711/103 |
| 2010/0005228 | A1* | 1/2010 | Fukutomi | G06F 11/108 711/103 |
| 2010/0250846 | A1* | 9/2010 | Hobbet | G06F 3/061 711/114 |
| 2011/0035548 | A1* | 2/2011 | Kimmel | G06F 3/061 711/114 |
| 2011/0302358 | A1* | 12/2011 | Yu | G06F 11/108 711/103 |
| 2012/0059978 | A1* | 3/2012 | Rosenband | G06F 3/0613 711/114 |
| 2012/0324191 | A1* | 12/2012 | Strange | G06F 11/008 711/165 |
| 2014/0310574 | A1* | 10/2014 | Yu | G06F 11/1072 714/773 |
| 2015/0205669 | A1* | 7/2015 | Sundaram | G06F 11/108 714/6.23 |
| 2016/0103629 | A1 | 4/2016 | Yamamoto et al. | |

FOREIGN PATENT DOCUMENTS

| | | |
|---|---|---|
| CN | 103036994 A | 4/2013 |
| EP | 2413245 A1 | 2/2012 |
| JP | 2005050303 A | 2/2005 |
| WO | 2009084286 A1 | 7/2009 |
| WO | 2011010344 A1 | 1/2011 |

OTHER PUBLICATIONS

High performance solid state storage under Linux; Seppanen et al; 2010 IEEE 26th Symposium on Mass Storage Systems and Technologies; May 3-7, 2010 (12 pages).*
Adaptive Data Migration in Multi-tiered Storage Based Cloud Environment; Zhang et al; 2010 IEEE 3rd International Conference on Cloud Computing; Jul. 5-10, 2017; pp. 148-155 (8 pages).*
OctopusFS: A Distributed File System with Tiered Storage Management; Kakoulli et al; Proceedings of the 2017 ACM International Conference on Management of Data; May 14-19, 2017; pp. 65-78 (14 pages).*
Partial English Translation and Abstract of Chinese Patent Application No. CN103036994, Oct. 14, 2015, 23 pages.
Foreign Communication From a Counterpart Application, Chinese Application No. 201380001625.3, Chinese Search Report dated Aug. 11, 2015, 7 pages.
Foreign Communication From a Counterpart Application, European Application No. 13892079.8, Extended European Search Report dated Apr. 11, 2016, 6 pages.
Partial English Translation and Abstract of Chinese Patent Application No. CN102713828A, Mar. 30, 2015, 13 pages.
Partial English Translation and Abstract of Chinese Patent Application No. CN102880570A, Mar. 30, 2015, 4 pages.
Foreign Communication From a Counterpart Application, PCT Application No. PCT/CN2013/084093, English Translation of International Search Report dated Jul. 1, 2014, 2 pages.
Foreign Communication From a Counterpart Application, PCT Application No. PCT/CN2013/084093, Written Opinion dated Jul. 8, 2014, 4 pages.
Partial English Translation and Abstract of Japanese Patent Application No. JPA2005050303, Aug. 10, 2016, 145 pages.
Foreign Communication From a Counterpart Application, Japanese Application No. 2015551104, Japanese Office Action dated Jul. 5, 2016, 3 pages.
Foreign Communication From a Counterpart Application, Japanese Application No. 2015551104, English Translation of Japanese Office Action dated Jul. 5, 2016, 3 pages.
Foreign Communication From a Counterpart Application, European Application No. 13892079.8, European Office Action dated Oct. 6, 2016, 7 pages.

* cited by examiner

DATA MIGRATION METHOD, DATA MIGRATION APPARATUS, AND STORAGE DEVICE

CROSS-REFERENCE TO RELATED APPLICATIONS

This application is a continuation of International Application NO PCT/CN2013/084093, filed on Sep. 24, 2013, which is hereby incorporated by reference in its entirety.

TECHNICAL FIELD

The present invention relates to storage technologies, and in particular, to a data migration method, a data migration apparatus, and a storage device.

BACKGROUND

A NAND flash is a non-volatile memory and is characterized by that data does not disappear after power-off; therefore, the NAND flash is widely used as an external or internal memory. For example, a solid-state disk (SSD) that is increasingly used in a computer system in recent years is implemented based on the flash memory. A solid-state disk may also be called a SSD. The SSD is characterized by a limited number of erasure times, and each read-write operation (may also be call an erasure operation) on the SSD is wear to the SSD to a certain degree; therefore, a lifetime of the SSD is related to a degree of wear. A higher degree of wear indicates a shorter lifetime. Because a bad block may occur due to a programming error or an erasure error when the NAND flash is used for a long period of time, and an increasing number of bad blocks may lead to an increase in the number of read-write times of the NAND flash within the entire SSD, the degree of wear is increased, thereby shortening the service life of the SSD.

At present, in order to meet a requirement of big data storage, it is usually necessary that multiple SSDs form an SSD storage array. If a lifetime of one SSD in the SSD storage array is shortened due to an increase in bad blocks, a lifetime of the SSD storage array is also shortened. That is, the lifetime of the SSD storage array depends on an SSD with a shortest lifetime included in the SSD storage array.

SUMMARY

Embodiments of the present invention provide a data migration method, a data migration apparatus, and a storage device, so as to prolong a service life of an SSD storage array.

A first aspect of the embodiments of the present invention provides a data migration method, where the method is applied to a storage system, the storage system includes a disk group, and the disk group includes multiple SSDs; and the method includes determining a source SSD in the disk group, where capacity usage of the source SSD is greater than average capacity usage of the disk group; determining at least one destination SSD in the disk group; calculating, according to the capacity usage of the source SSD and the average capacity usage, an amount of data to be migrated out of the source SSD; and migrating data of the source SSD to the destination SSD according to the amount of the data to be migrated out of the source SSD.

In a first implementation manner of the first aspect of the embodiments of the present invention, the destination SSD is another SSD in the disk group except the source SSD.

In a second implementation manner of the first aspect of the embodiments of the present invention, the destination SSD is an SSD whose capacity usage is less than the average capacity usage in the disk group.

In a third implementation manner of the first aspect of the embodiments of the present invention, the destination SSD is a preset SSD corresponding to the source SSD.

In a fourth implementation manner of the first aspect of the embodiments of the present invention, the determining at least one destination SSD in the disk group includes determining the at least one destination SSD in the disk group according to load balancing.

In a fifth implementation manner of the first aspect of the embodiments of the present invention, the migrating data of the source SSD to the destination SSD according to the amount of the data to be migrated out of the source SSD includes calculating, according to capacity usage of the destination SSD and the average capacity usage, an amount of data to be migrated to each destination SSD; and migrating the data of the source SSD to each destination SSD according to the amount of the data to be migrated out of the source SSD and the amount of the data to be migrated to each destination SSD.

With reference to the fifth implementation manner of the first aspect of the embodiments of the present invention, in a sixth implementation manner of the first aspect of the embodiments of the present invention, the calculating, according to capacity usage of the destination SSD and the average capacity usage, an amount of data to be migrated to each destination SSD includes obtaining a difference value between capacity usage of each destination SSD and the average capacity usage; and multiplying the difference value between the capacity usage of each destination SSD and the average capacity usage by an available physical capacity of each destination SSD, where an obtained product is the amount of the data to be migrated to each destination SSD.

In a seventh implementation manner of the first aspect of the embodiments of the present invention, the calculating, according to the capacity usage of the source SSD and the average capacity usage, an amount of data to be migrated out of the source SSD includes obtaining a difference value between the capacity usage of the source SSD and the average capacity usage; and multiplying the difference value between the capacity usage of the source SSD and the average capacity usage by an available physical capacity of the source SSD, where an obtained product is the amount of the data to be migrated out of the source SSD.

A second aspect of the embodiments of the present invention provides a data migration apparatus, where the apparatus includes a determining module, configured to determine a source SSD in a disk group, where capacity usage of the source SSD is greater than average capacity usage of the disk group; and determine at least one destination SSD in the disk group; a calculating module, configured to calculate, according to the capacity usage of the source SSD and the average capacity usage, an amount of data to be migrated out of the source SSD; and a migrating module, configured to migrate data of the source SSD to the destination SSD according to the amount of the data to be migrated out of the source SSD.

In a first implementation manner of the second aspect of the embodiments of the present invention, the destination SSD is another SSD in the disk group except the source SSD.

In a second implementation manner of the second aspect of the embodiments of the present invention, the destination SSD is an SSD whose capacity usage is less than the average capacity usage in the disk group.

In a third implementation manner of the second aspect of the embodiments of the present invention, the destination SSD is a preset SSD corresponding to the source SSD.

In a fourth implementation manner of the second aspect of the embodiments of the present invention, the migrating module is configured to calculate, according to capacity usage of the destination SSD and the average capacity usage, an amount of data to be migrated to each destination SSD, and migrate the data of the source SSD to each destination SSD according to the amount of the data to be migrated out of the source SSD and the amount of the data to be migrated to each destination SSD.

With reference to the fourth implementation manner of the second aspect of the embodiments of the present invention, in a fifth implementation manner of the second aspect of the embodiments of the present invention, the migrating module is configured to obtain a difference value between capacity usage of each destination SSD and the average capacity usage, and multiply the difference value between the capacity usage of each destination SSD and the average capacity usage by an available physical capacity of each destination SSD, where an obtained product is the amount of the data to be migrated to each destination SSD.

In a sixth implementation manner of the second aspect of the embodiments of the present invention, the calculating module is configured to obtain a difference value between the capacity usage of the source SSD and the average capacity usage, and multiply the difference value between the capacity usage of the source SSD and the average capacity usage by an available physical capacity of the source SSD, where an obtained product is the amount of the data to be migrated out of the source SSD.

A third aspect of the embodiments of the present invention provides a storage device, including a processor, a memory, a system bus, and a communication interface, where the processor, the memory, and the communication interface are connected to and communicate with each other using the system bus; the communication interface is configured to communicate with the storage device; the memory is configured to store a computer executable instruction; and the processor is configured to run the computer executable instruction and execute the data migration method according to the first aspect.

A fourth aspect of the embodiments of the present invention provides a computer program product, and the computer program product includes a computer readable storage medium that stores program code, where an instruction included in the program code is used to execute the data migration method according to the first aspect.

In the embodiments of the present invention, data in an SSD whose capacity usage is greater than average capacity usage of a disk group is migrated to a determined destination SSD, so that capacity usage of each SSD in the disk group approaches the average capacity usage, thereby achieving wear leveling and prolonging a service life of the disk group.

BRIEF DESCRIPTION OF DRAWINGS

To describe the technical solutions in the embodiments of the present invention more clearly, the following briefly introduces the accompanying drawings required for describing the embodiments or the prior art. The accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention.

System Architecture of an Embodiment of the Present Invention

Figure 1:
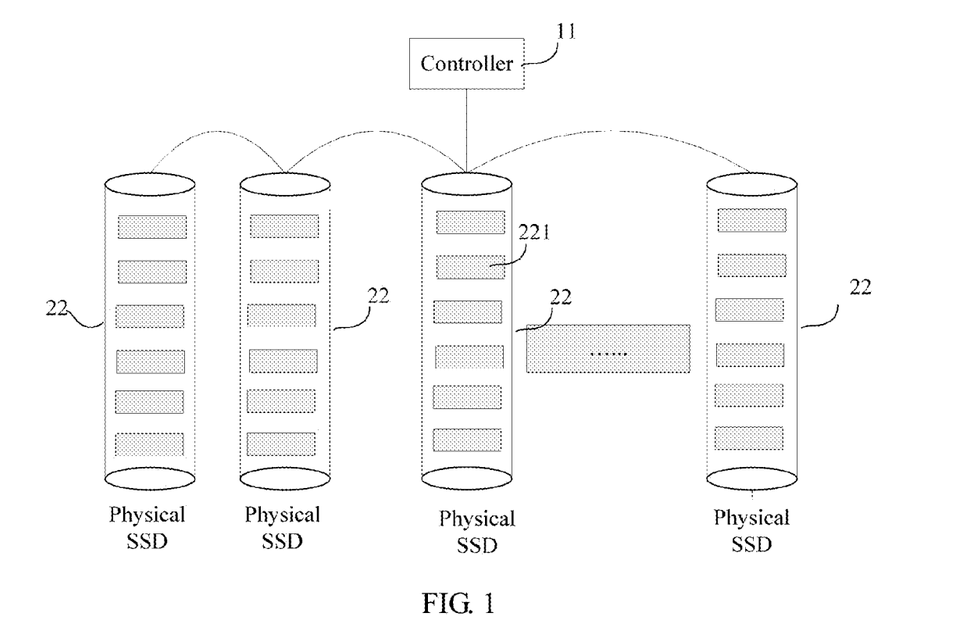
FIG. 1 is a schematic diagram of an application network architecture of a data migration method according to an embodiment of the present invention.

A storage array management method according to an embodiment of the present invention may be implemented in a storage system. FIG. 1 is a schematic diagram of a system architecture of the storage array management method according to this embodiment of the present invention. As shown in FIG. 1, the storage system includes a controller 11 and a storage device 22. In this embodiment, that the storage device 22 is an SSD is used as an example for description. A solid-state disk may also be called a solid-state drive (SSD) and called a hard disk for short.

FIG. 1 is merely an exemplary description and is not intended to limit a specific networking manner, for example, both cascading tree networking and ring networking are acceptable, as long as the controller 11 and the storage device 22 can communicate with each other.

The controller 11 may include any computing device known in the prior art, such as a server or a desktop computer. In the controller 11, an operating system and other application programs are installed. The controller 11 may manage the storage device 22, for example, control data migration in the storage device 22.

The storage device 22 may be a storage device known in the prior art, such as an SSD or a direct access storage device (DASD). In FIG. 1, that the storage device 22 is an SSD is used as an example for description. N physical SSDs form a storage array, which may also be called a disk group. A basic idea of the storage array is to combine multiple hard disks that are relatively cost-effective to achieve performance that equals or surpasses that of a hard disk with a high price and a huge capacity. The number N of physical SSDs in one storage array cannot be less than a lower limit, for example, 10; the number N of physical SSDs in one storage array cannot be greater than an upper limit, for example, 30. The N physical SSDs included in the storage array may be SSDs of different models and with different capacities, SSDs of different models and with a same capacity, SSDs of a same model and with different capacities, or SSDs of a same model and with a same capacity.

Unless otherwise specified, the SSDs called in this embodiment of the present invention all refer to physical SSDs.

Each physical SSD may be divided into fine-grained chunks (CK) 221 of a same size. A chunk may also be called a logical SSD.

In addition, multiple CKs may form logical space according to a specified type of redundant array of independent disks (RAID), where the logical space is a chunk group (CKG). All CKs included in one CKG must belong to different SSDs. A redundant array of independent disks may also be called a RAID.

When a large number of bad blocks occur in an SSD, capacity usage of the SSD increases, and a lifetime of the SSD is shortened; a lifetime of the SSD storage array depends on an SSD with a shortest lifetime included in the SSD storage array. Therefore, in order to prolong the lifetime of the SSD storage array, part of data in an SSD whose capacity usage is greater than an average capacity usage of the SSD storage array may be migrated to another SSD in the SSD storage array, so as to level a degree of wear between the SSDs.

Data Migration Method

Figure 2:
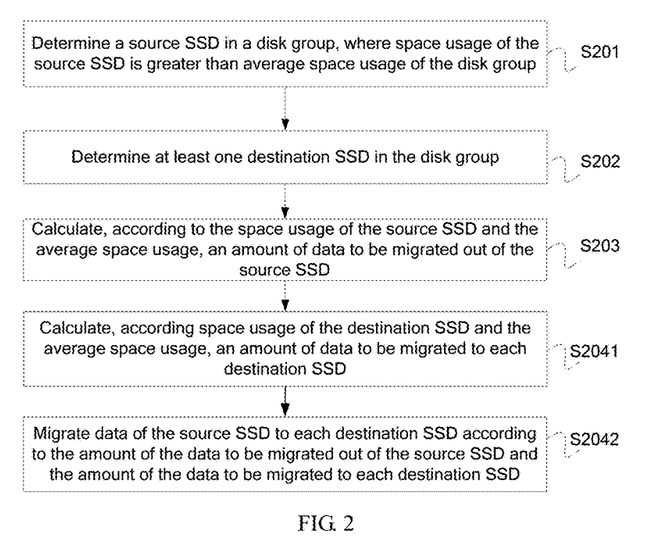
FIG. 2 is a flowchart of a data migration method according to an embodiment of the present invention.

The following introduces a data migration method according to an embodiment of the present invention. FIG. 2 is a flowchart of the data migration method according to this embodiment of the present invention. The following steps may be executed by a processor in a controller. Referring to FIG. 2, the method includes:

Step S201: Determine a source SSD in a disk group, where capacity usage of the source SSD is greater than average capacity usage of the disk group.

In this embodiment of the present invention, an SSD whose capacity usage is greater than the average capacity usage of the disk group is used as the source SSD. The average capacity usage of the disk group is a ratio of an amount of data written to the disk group by a user to an available physical capacity of the disk group. The capacity usage of the SSD is a ratio of an amount of data written to the SSD by a user to an available physical capacity of the SSD. The amount of the data written to the disk group by the user is a total amount of data written to all SSDs in the disk group by users. The available physical capacity of the disk group is the sum of available physical capacities of all the SSDs in the disk group.

It should be noted that, in this embodiment of the present invention, one disk group may be considered as one SSD storage array.

Physically, an SSD includes multiple blocks. When the SSD is used for a long period of time, some blocks may encounter a fault due to a programming error or an erasure error, and a read-write operation cannot be performed on the blocks; therefore the blocks are called bad blocks. For one SSD, increasing capacity usage of the SSD is generally caused by an increase in the number of bad blocks in the SSD. Therefore, the determining a source SSD in the disk group may be implemented by monitoring a size of bad blocks in each SSD in the disk group. When a size of bad blocks in an SSD exceeds a preset threshold, capacity usage of the SSD is greater than the average capacity usage of the disk group. In addition, some hardware-related faults, such as damage to a pin of a flash granule, may also cause an increase in the capacity usage of the SSD.

Optionally, the controller may monitor the capacity of the bad blocks in each SSD in the disk group in real time. When a size of bad blocks in an SSD exceeds the preset threshold, it is considered that capacity usage of the SSD is increased, and it is determined that the SSD is the source SSD; or, when a size of bad blocks in an SSD exceeds the preset threshold, SSD may automatically report the size of bad blocks to the controller.

Optionally, the controller may monitor capacity usage of each SSD in the disk group in real time. When capacity usage of an SSD is greater than the average capacity usage, it is determined that the SSD is the source SSD in the disk group; or, when capacity usage of an SSD is greater than the average capacity usage, SSD may automatically report the size of bad blocks to the controller.

Optionally, the controller may monitor a user-visible capacity of each SSD in the disk group in real time. When a user-visible capacity of an SSD decreases, it is determined that the SSD is the source SSD in the disk group; or when a user-visible capacity of an SSD decreases, the SSD may automatically report the size of bad blocks to the controller. For one SSD, internal storage space of the SSD may be divided into two parts: data storage space and redundancy space. A size of the data storage space of the SSD is a user-visible capacity. The redundancy space of the SSD is NAND flash storage space that is provided by the SSD and exceeds the user-visible capacity. Using a 400 gigabyte (GB) SSD as an example, this disk actually includes NAND flash granules of 512 GB, but a user-visible capacity is only 400 GB, and remaining 112 GB is used as redundancy space. When a NAND flash is used for a long period of time, a bad block may occur due to a programming error or an erasure error. A read-write operation cannot be performed on the bad block; therefore, data stored in the bad block needs to be migrated to the redundancy space of the SSD. The bad block is labeled inside the SSD, so that the labeled bad block is no longer used subsequently. The redundancy space is mainly used to replace a bad block, thereby ensuring that the SSD always has 400 GB data storage space when it is used.

Step S202: Determine at least one destination SSD in the disk group.

In order to lower the capacity usage of the source SSD, data stored in the source SSD may be migrated to another SSD in the disk group. Therefore, at least one destination SSD needs to be determined in the disk group.

Optionally, another SSD in the disk group except the source SSD may be used as the destination SSD.

Optionally, an SSD whose capacity usage is less than the average capacity usage in the disk group may be used as the destination SSD.

Optionally, a correspondence between the source SSD and the destination SSD may be preset, and the destination SSD is obtained by a query in the correspondence according to the source SSD.

Optionally, a load of each SSD in the disk group may be obtained, and the destination SSD is determined according to a load balancing principle.

It should be noted that, it can be known from the forgoing description that the destination SSD may be all SSDs in the disk group except the source SSD, or may be some SSDs in the disk group except the source SSD, which is not limited herein.

Step S203: Calculate, according to the capacity usage of the source SSD and the average capacity usage, an amount of data to be migrated out of the source SSD.

In this embodiment of the present invention, the amount of the data to be migrated out of the source SSD may be an amount of data that is to be migrated out of the source SSD for a purpose of making the capacity usage of the source SSD reach the average capacity usage.

Optionally, a difference value between the capacity usage of the source SSD and the average capacity usage may be obtained, and the difference value between the capacity usage of the source SSD and the average capacity usage is multiplied by an available physical capacity of the source SSD, where an obtained product is the amount of the data to be migrated out of the source SSD.

Optionally, an amount of data written to the source SSD by a user and an available physical capacity of the source SSD may be obtained. A difference value that is obtained by subtracting a product of the available physical capacity of the source SSD and the average capacity usage from the amount of the data written to the source SSD by the user is the amount of the data to be migrated out of the source SSD.

It should be noted that there is no sequence between step S202 and step S203.

Step S204: Migrate data of the source SSD to the destination SSD according to the amount of the data to be migrated out of the source SSD.

In this embodiment of the present invention, the data is migrated out of the source SSD in a unit of chunk, and each chunk is of a fixed size. Therefore, the number of chunks to be migrated out of the source SSD may be obtained by dividing the amount of the data to be migrated out of the source SSD by a size of a chunk. In a case in which the amount of the data to be migrated out of the source SSD cannot be exactly divided, the number of chunks to be migrated out of the source SSD may be obtained in a manner of rounding off a remainder.

It should be noted that, because the data is migrated in a unit of chunk, the capacity usage of each SSD in the disk group after data migration is approximately equal to the average capacity usage, and may not be absolutely equal to the average capacity usage.

In this embodiment of the present invention, data in an SSD whose capacity usage is greater than average capacity usage of a disk group is migrated to a determined destination SSD, so that capacity usage of each SSD in the disk group approaches the average capacity usage, thereby achieving wear leveling and prolonging a service life of the disk group.

Optionally, in the forgoing embodiment, step S204 may include:

Step S2041: Calculate, according to capacity usage of the destination SSD and the average capacity usage, an amount of data to be migrated to each destination SSD.

In this embodiment of the present invention, the amount of the data to be migrated to each destination SSD is an amount of data that is to be migrated to each destination SSD for a purpose of making the capacity usage of each destination SSD reach the average capacity usage.

There may be more than one determined destination SSD; therefore, the amount of the data to be migrated to each destination SSD needs to be calculated separately.

Optionally, a difference value between the capacity usage of each destination SSD and the average capacity usage may be obtained, and the difference value between the capacity usage of each destination SSD and the average capacity usage is multiplied by an available physical capacity of each destination SSD, where an obtained product is the amount of the data to be migrated to each destination SSD.

Optionally, an amount of data written to each destination SSD by a user and an available physical capacity of each destination SSD may be obtained. A difference value that is obtained by subtracting the amount of the data written to each destination SSD by the user from a product of the available physical capacity of each destination SSD and the average capacity usage is the amount of the data to be migrated to each destination SSD.

Optionally, the amount of the data to be migrated out of the source SSD may be divided by the number of destination SSDs, so as to obtain the amount of the data to be migrated to each destination SSD.

Step S2042: Migrate the data of the source SSD to each destination SSD according to the amount of the data to be migrated out of the source SSD and the amount of the data to be migrated to each destination SSD.

In this embodiment of the present invention, the data is migrated to each destination SSD in a unit of chunk, and each chunk is of a fixed size. Therefore, the number of chunks to be migrated to each destination SSD may be obtained by dividing the amount of the data to be migrated to each destination SSD by a size of a chunk. In a case in which the amount of the data to be migrated to each destination SSD cannot be exactly divided, the number of chunks to be migrated to each destination SSD may be obtain in a manner of rounding off a remainder.

Optionally, after the number (assuming that the number is N, where N is a natural number that is greater than 1) of chunks to be migrated out of the source SSD is calculated, N chunks may be randomly selected from the source SSD. According to a preset disk selection algorithm and the number of chunks to be migrated to each destination SSD, an idle chunk is successively determined in a destination SSD for each chunk of the N chunks. Then, data stored in the N chunks of the source SSD is separately migrated to the destination SSD.

For example, the $i^{th}$ chunk of the source SSD is first determined, where i is a natural number, and 0<i<N+1.

An idle chunk is determined in another SSD in the disk group except the source SSD according to the number of chunks to be migrated to each destination SSD and the preset disk selection algorithm, where the SSD in which the idle chunk is located is different from an SSD in which another chunk included in a CKG is located, where the $i^{th}$ chunk belongs to the CKG.

Data stored in the $i^{th}$ chunk of the source SSD is migrated to the idle chunk.

When i<N, i=i+1 is performed, that is, the $i^{th}$ chunk of the source SSD is determined subsequently.

The following uses a specific example to describe a data migration process. Assume that there are a total of 9 SSDs in a disk group, where a physical capacity of each SSD is 128 GB, service pressure borne by each SSD is the same, and the amount of data written to each SSD by a user is 60 GB.

If a size of bad blocks in an SSD reaches 8 GB, an available physical capacity of the SSD is: 128−8=120 (GB), and capacity usage of the SSD is: 60/120=0.5.

An amount of data written to the entire disk group by the user is: 60*9=540 (GB), and an available physical capacity of the entire disk group is: 128*8+(128-8)=1144 (GB). Therefore, average capacity usage of the disk group is: 540/1144=0.4720.

Therefore, it may be determined that the SSD in which the bad blocks are generated is a source SSD, and the capacity usage 0.5 of the SSD is greater than the average capacity usage 0.4720. In order to make capacity usage of each SSD in the entire disk group reach the average capacity usage, data of the source SSD needs to be migrated to another SSD. That the rest 8 SSDs are used as destination SSDs is used as an example herein.

The amount of data to be migrated out of the source SSD is: Amount of data written to the source SSD by the user—Average capacity usage of the source SSD*Available physical capacity of the source SSD. Therefore, Amount of data to be migrated out of the source SSD=60−(540/1144)*120=3.3566 (GB)

Alternatively, the amount of the data to be migrated out of the source SSD is: (Capacity usage of the source SSD−Average capacity usage)*Available physical capacity of the source SSD=(0.5−540/1144)*120=3.3566 (GB).

The amount of data to be migrated to each destination SSD is: Average capacity usage*Available physical capacity of a destination SSD−Amount of data written to the destination SSD by the user=(540/1144)*128−60=0.4196 (GB).

Alternatively, the amount of the data to be migrated out of each destination SSD is: (Average capacity usage-Capacity usage of a destination SSD)*Available physical capacity of the destination SSD=(540/1144−60/128)*128=0.4196 (GB).

Then, the data in the source SSD is migrated, in a unit of chunk, to each destination SSD according to the amount of the data to be migrated out of the source SSD and the amount of the data to be migrated to each destination SSD.

After the data migration is complete, the capacity usage of the source SSD is: (60−3.3566)/120=0.4720, and the capacity usage of each of other SSDs is: (60+0.4196)/128=0.4720.

It can belearned that, after the data migration is complete, capacity usage of each SSD in a disk group is equal to an average capacity usage. This indicates that wear leveling between SSDs is implemented, thereby prolonging a service life of an entire SSD storage array.

Apparatus According to an Embodiment of the Present Invention

Figure 3:
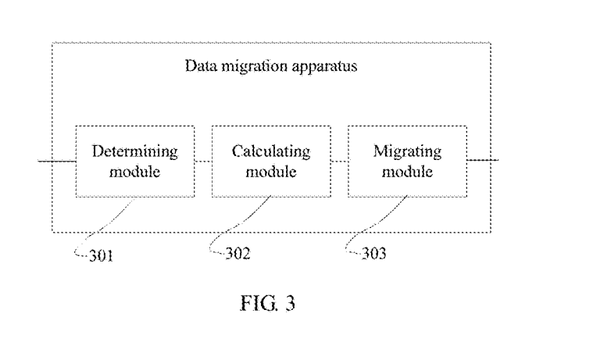
FIG. 3 is a schematic structural diagram of a data migration apparatus according to an embodiment of the present invention.

The following introduces a data migration apparatus according to an embodiment of the present invention. FIG. 3 is a structural diagram of the data migration apparatus according to this embodiment of the present invention, and the apparatus includes a determining module 301, configured to determine a source SSD in a disk group, where capacity usage of the source SSD is greater than average capacity usage of the disk group; and determine at least one destination SSD in the disk group; a calculating module 302, configured to calculate, according to the capacity usage of the source SSD and the average capacity usage, an amount of data to be migrated out of the source SSD capacity usage; and a migrating module 303, configured to migrate data of the source SSD to the destination SSD according to the amount of the data to be migrated out of the source SSD.

Optionally, the destination SSD is another SSD in the disk group except the source SSD.

Optionally, the destination SSD is an SSD whose capacity usage is less than the average capacity usage in the disk group.

Optionally, the destination SSD is a preset SSD corresponding to the source SSD.

The migrating module 303 is configured to calculate, according to capacity usage of the destination SSD and the average capacity usage, an amount of data to be migrated to each destination SSD capacity usage, and migrate the data of the source SSD to each destination SSD according to the amount of the data to be migrated out of the source SSD and the amount of the data to be migrated to each destination SSD. A difference value between capacity usage of each destination SSD and the average capacity usage may be obtained, and the difference value between the capacity usage of each destination SSD and the average capacity usage is multiplied by an available physical capacity of each destination SSD, where an obtained product is the amount of the data to be migrated to each destination SSD.

The calculating module 302 is configured to obtain a difference value between the capacity usage of the source SSD and the average capacity usage, and multiply the difference value between the capacity usage of the source SSD and the average capacity usage by an available physical capacity of the source SSD, where an obtained product is the amount of the data to be migrated out of the source SSD.

The apparatus according to this embodiment of the present invention may be disposed in the controller described in the previous embodiments and configured to execute the data migration method described in the previous embodiments. For a detailed description of a function of each module, reference may be made to the description in the method embodiment, and details are not repeatedly described herein.

In this embodiment of the present invention, data in an SSD whose capacity usage is greater than average capacity usage of a disk group is migrated to a determined destination SSD, so that capacity usage of each SSD in the disk group approaches the average capacity usage, thereby achieving wear leveling and prolonging a service life of the disk group.

Figure 4:
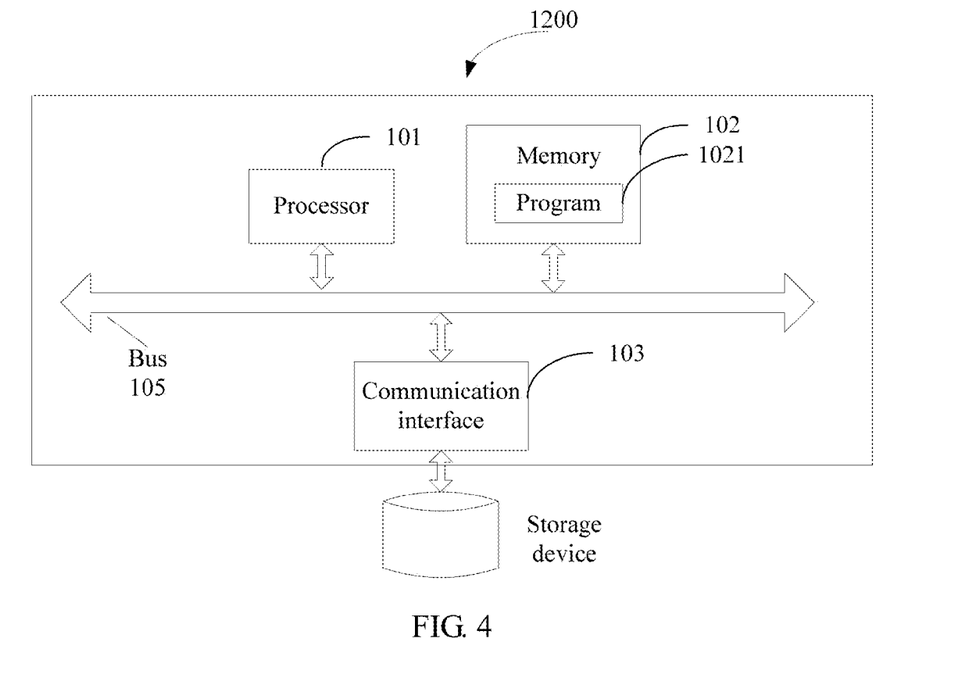
FIG. 4 is a schematic structural diagram of a storage device according to an embodiment of the present invention.

As shown in FIG. 4, a storage device 1200 is provided according to an embodiment of the present invention and includes a processor 101, a memory 102, a system bus 105, and a communication interface 103, where the processor 101, the memory 102, and the communication interface 103 are connected to and communicate with each other using the system bus 105.

The processor 101 may be a single-core or multi-core central processing unit, or an application-specific integrated circuit, or one or more integrated circuits configured to implement this embodiment of the present invention.

The memory 102 may be a high-speed random-access memory (RAM), or may be a non-volatile memory, for example, at least one hard disk memory.

The communication interface 103 is configured to communicate with the storage device 1200.

The memory 102 is configured to store a computer executable instruction 1021. The computer executable instruction 1021 may include program code.

When a computer runs, the processor 101 runs the computer executable instruction 1021, so as to execute the process in the method described in FIG. 2.

An embodiment of the present invention further provides a computer program product for data processing, and the computer program product includes a computer readable storage medium that stores program code, where an instruction included in the program code is used to execute the process in the method described in FIG. 2.

In this embodiment of the present invention, data in an SSD whose capacity usage is greater than average capacity usage of a disk group is migrated to a determined destination SSD, so that capacity usage of each SSD in the disk group approaches the average capacity usage, thereby achieving wear leveling and prolonging a service life of the disk group.

A person of ordinary skill in the art should understand that each aspect of the present invention or a possible implementation manner of each aspect may be implemented as a system, a method, or a computer program product. Therefore, each aspect of the present invention or the possible implementation manner of each aspect may use a form of a complete hardware embodiment, a complete software embodiment (including firmware, resident software, and the like), or an embodiment combining software and hardware, which is uniformly referred to as "circuit", "module", or "system" herein. In addition, each aspect of the present invention or the possible implementation manner of each aspect may use a form of a computer program product, where the computer program product refers to computer readable program code stored in a computer readable medium.

A computer readable medium may be a computer readable signal medium or a computer readable storage medium. The computer readable storage medium includes but is not limited to an electronic, magnetic, optical, electromagnetic, infrared, or semiconductor system, device, or apparatus, or any appropriate combination thereof, such as a RAM, a read-only memory (ROM), an erasable programmable read-only memory (EPROM or flash memory), an optical fiber, or a portable read-only memory (CD-ROM).

A processor in a computer reads computer readable program code stored in a computer readable medium, so that the processor can execute a function and an action specified in each step or a combination of steps in a flowchart, and an apparatus is generated to implement a function and an action specified in each block or a combination of blocks in a block diagram.

Computer readable program code may be completely executed on a computer of a user, partially executed on the computer of the user, used as a separate software package, partially executed on the computer of the user and partially executed on a remote computer, or completely executed on the remote computer or a server. It should also be noted that in some alternative implementation solutions, functions denoted in each step of flowcharts or in each block of block diagrams may not occur in the sequence denoted in the diagrams. For example, depending on an involved function, two steps or two blocks successively marked may be approximately performed concurrently, or these blocks sometimes may be performed in a reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for extending life of a storage system which includes a storage controller and a disk group, wherein the disk group includes a plurality of solid-state disks (SSDs), wherein each of the SSDs is divided into multiple chunks that are accessible to the storage controller, the method performed by the storage controller comprising:
    monitoring a bad blocks capacity of each of the plurality of SSDs, wherein each SSD includes multiple blocks, and wherein at least one SSD includes one or more bad blocks;
    selecting the at least one SSD as a source SSD in response to the bad blocks capacity of one of the SSDs reaching a threshold;
    calculating an amount of data to be migrated from the source SSD based on a capacity usage ratio of the source SSD and an average capacity usage ratio of the disk group, wherein the capacity usage ratio of the source SSD is greater than the average capacity usage ratio of the disk group, wherein the capacity usage ratio of the source SSD is a ratio of an occupied capacity of the source SSD divided by an available capacity of the source SSD, wherein the average capacity usage ratio of the disk group is a ratio of an occupied capacity of the disk group divided by an available capacity of the disk group;
    identifying a number of chunks to be migrated from the source SSD based on the amount of data to be migrated from the source SSD and a size of each chunk;
    selecting one or more destination SSDs in the disk group with a capacity usage ratio less than the average capacity usage ratio of the disk group; and
    migrating the data to be migrated from the source SSD to the one or more destination SSDs according to the number of chunks,
    wherein the data to be migrated from the source SSD is migrated in a unit of chunk,
    wherein each of multiple chunks is unit of a chunk group, and
    wherein the chunk group includes a plurality of chunks each belonging to different SSDs.

2. The method according to claim 1, wherein migrating the data comprises:
    calculating, based on a capacity usage ratio of each destination SSD and the average capacity usage ratio of the disk group, an amount of data allowed to be migrated to each destination SSD; and
    migrating the amount of data allowed to be migrated to each destination SSD, wherein the amount of data allowed to be migrated to each destination SSD is at least a portion of the data to be migrated from the source SSD.

3. The method according to claim 2, wherein calculating, based on the capacity usage ratio of each destination SSD and the average capacity usage ratio of the disk group, the amount of data allowed to be migrated to each destination SSD comprises:
    obtaining a difference value between the capacity usage ratio of each destination SSD and the average capacity usage ratio of the disk group; and
    obtaining the amount of data allowed to be migrated to each destination SSD by multiplying the difference value between the capacity usage ratio of each destination SSD and the average capacity usage ratio of the disk group by an available capacity of the destination SSD.

4. The method according to claim 1, wherein calculating the amount of data to be migrated from the source SSD based on the capacity usage ratio of the source SSD and the average capacity usage ratio comprises:
    obtaining a difference value between the capacity usage ratio of the source SSD and the average capacity usage ratio of the disk group; and
    obtaining the amount of data to be migrated from the source SSD by multiplying the difference value between the capacity usage ratio of the source SSD and the average capacity usage ratio of the disk group by the available capacity of the source SSD.

5. The method according to claim 1, wherein the amount of data to be migrated from the source SSD is calculated based on the capacity usage ratio of the source SSD and the average capacity usage ratio in order to reduce a difference between the capacity usage ratio of the source SSD and the average capacity usage ratio of the disk group.

6. A storage system for storing data with optimized data distribution among solid-state disks (SSDs), the storage system comprising:
a processor; and
a plurality of SSDs for storing data, wherein each of the SSDs is divided into multiple chunks that are accessible to a processor,
wherein the processor is connected to the SSDs and is configured to:
monitor a bad blocks capacity of each of the plurality of SSDs, wherein each SSD includes multiple blocks, and wherein at least one SSD includes one or more bad blocks;
selecting the at least one SSD as a source SSD in response to the bad blocks capacity of one of the SSDs reaching a threshold;
calculate an amount of data to be migrated from the source SSD based on a capacity usage ratio of the source SSD and an average capacity usage ratio of the disk group, wherein the capacity usage ratio of the source SSD is greater than the average capacity usage ratio of the disk group, wherein the capacity usage ratio of the source SSD is a ratio of an occupied capacity of the source SSD divided by an available capacity of the source SSD, wherein the average capacity usage ratio of the disk group is a ratio of an occupied capacity of the disk group divided by an available capacity of the disk group;
identify a number of chunks to he migrated from the source SSD based on the amount of data to be migrated from the source SSD and a size of each chunk;
select one or more destination SSDs in the disk group with a capacity usage ratio less than the average capacity usage ratio of the disk group; and
migrate the data to he migrated from the source SSD to the one or more destination SSDs according to the number of chunks,
wherein the data to be migrated from the source SSD is migrated in a unit of chunk,
wherein each of multiple chunks is a unit of a chunk group, and
wherein the chunk group includes a plurality of chunks each belonging to different SSDs.

7. The storage system according to claim 6, wherein the processor is further configured to:
calculate, based on a capacity usage ratio of each destination SSD and the average capacity usage ratio of the disk group, an amount of data allowed to be migrated to each destination SSD; and
migrate the amount of data allowed to be migrated to each destination SSD, wherein the amount of data allowed to be migrated to each destination SSD is at least a portion of the data to be migrated from the source SSD.

8. The storage system according to claim 7, wherein the processor is further configured to:
obtain a difference value between the capacity usage ratio of each destination SSD and the average capacity usage ratio of the disk group; and
obtain the amount of data allowed to be migrated to each destination SSD by multiplying the difference value between the capacity usage ratio of each destination SSD and the average capacity usage ratio of the disk group by an available capacity of each destination SSD.

9. The storage system according to claim 6, wherein the processor is further configured to:
obtain a difference value between the capacity usage ratio of the source SSD and the average capacity usage ratio of the disk group; and
obtain the amount of data to be migrated from the source SSD by multiplying the difference value between the capacity usage ratio of the source SSD and the average capacity usage ratio of the disk group by the available capacity of the source SSD.

10. The storage system according to claim 6, wherein the amount of data. to be migrated from the source SSD is calculated based on the capacity usage ratio of the source SSD and the average capacity usage ratio in order to reduce a difference between the capacity usage ratio of the source SSD and the average capacity usage ratio of the disk group.

11. A storage controller for storing data with optimized data distribution among solid-state disks (SSDs), wherein each of the SSDs is divided into multiple chunks that are accessible to the storage controller, the storage controller comprising:
a communication interface for communicating with the SSDs; and
a processor connected to the communication interface and configured to:
monitor a bad blocks capacity of each of the plurality of SSDs, wherein each SSD includes multiple blocks, and wherein at least one SSD includes one or more bad blocks;
selecting the at least one SSD as a source SSD in response to the bad blocks capacity of one of the SSDs reaching a threshold;
calculate an amount of data to be migrated from the source SSD based on a capacity usage ratio of the source SSD and an average capacity usage ratio of the disk group, Wherein the capacity usage ratio of the source SSD is greater than the average capacity usage ratio of the disk group, wherein the capacity usage ratio of the source SSD is a ratio of an occupied capacity of the source SSD divided by an available capacity of the source SSD, wherein the average capacity usage ratio of the disk group is a ratio of an occupied capacity of the disk group divided by an available capacity of the disk group;
identify a number of chunks to be migrated from the source SSD based on the amount of data to be migrated from the source SSD and a size of each chunk;
select one or more destination SSDs in the disk group with a capacity usage ratio less than the average capacity usage ratio of the disk group; and
migrate the data to be migrated from the source SSD to the one or more destination SSDs according to the number of chunks,
wherein the data to be migrated from the source SSD is migrated in a unit of chunk,
wherein each of multiple chunks is a unit of a chunk group, and
wherein the chunk group includes a plurality of chunks each belonging to different SSDs.

12. The storage controller according to claim 11, Wherein the processor is further configured to:
calculate, based on a capacity usage ratio of each destination SSD and the average capacity usage ratio of the disk group, an amount of data allowed to be migrated to each destination SSD; and migrate the amount of data allowed to be migrated to each destination SSD, wherein the amount of data allowed to be migrated to each destination SSD is at least a portion of the data to be migrated from the source SSD.

13. The storage controller according to claim 12, wherein the processor is further configured to;

obtain a difference value between the capacity usage ratio of each destination SSD and the average capacity usage ratio of the disk group; and obtain the amount of data allowed to be migrated to each destination SSD by multiplying the difference value between the capacity usage ratio of each destination SSD and the average capacity usage ratio of the disk group by an available capacity of each destination SSD.

14. The storage controller according to claim 11, wherein the processor is configured further to:

obtain a difference value between the capacity usage ratio of the source SSD and the average capacity usage ratio of the disk group; and obtain the amount of data to be migrated from the source SSD by multiplying the difference value between the capacity usage ratio of the source SSD and the average capacity usage ratio of the disk group by the available capacity of the source SSD.

15. The storage controller according to claim 11, wherein the amount of data to be migrated from the source SSD is calculated based on the capacity usage ratio of the source SSD and the average capacity usage ratio in order to reduce a difference between the capacity usage ratio of the source SSD and the average capacity usage ratio of the disk group.

\* \* \* \* \*